(12) United States Patent
Li et al.

(10) Patent No.: US 11,005,260 B2
(45) Date of Patent: *May 11, 2021

(54) LEAKAGE CURRENT DETECTION AND INTERRUPTION DEVICE FOR POWER CORD, AND POWER CONNECTOR AND APPLIANCE EMPLOYING THE SAME

(71) Applicant: Chengli Li, Suzhou (CN)

(72) Inventors: Chengli Li, Suzhou (CN); Long Chen, Suzhou (CN)

(73) Assignee: Chengli Li, Suzhou (CN)

( * ) Notice: Subject to any disclaimer, the term of this patent is extended or adjusted under 35 U.S.C. 154(b) by 57 days.

This patent is subject to a terminal disclaimer.

(21) Appl. No.: 16/687,129

(22) Filed: Nov. 18, 2019

(65) Prior Publication Data

US 2020/0091707 A1    Mar. 19, 2020

Related U.S. Application Data

(63) Continuation-in-part of application No. 15/718,661, filed on Sep. 28, 2017, now Pat. No. 10,557,883.

(30) Foreign Application Priority Data

Sep. 22, 2017  (CN) .......................... 201710864829.X
Sep. 22, 2017  (CN) .......................... 201721222432.2
Nov. 1, 2019   (CN) .......................... 201921875084.8

(51) Int. Cl.
*H02H 7/00*     (2006.01)
*H02H 7/22*     (2006.01)
*H01R 13/717*   (2006.01)
*H02H 1/00*     (2006.01)
*H01R 13/713*   (2006.01)

(52) U.S. Cl.
CPC ........... *H02H 7/228* (2013.01); *H01R 13/713* (2013.01); *H01R 13/7175* (2013.01); *H02H 1/0007* (2013.01)

(58) Field of Classification Search
None
See application file for complete search history.

(56) References Cited

U.S. PATENT DOCUMENTS 4,707,759 A    11/1987   Bodkin
5,708,364 A    1/1998    Vokey et al.
(Continued)

*Primary Examiner* — Stephen W Jackson
(74) *Attorney, Agent, or Firm* — Chen Yoshimura LLP

(57) ABSTRACT

A leakage current detection and interruption (LCDI) device for power cord, and power connector and appliance employing the same. The LCDI device includes a switch module coupled on the power supply lines to control electrical connection between input and output ends of the device; a leakage current detection module including a leakage current detection line, for detecting a leakage current on the power supply lines and outputting a leakage current fault signal accordingly; a drive module, for driving the switch module to disconnect the electrical connection in response to the leakage current fault signal and/or an open circuit fault signal, the open circuit fault signal representing an open circuit condition of the leakage current detection line; and a test module including a test switch, coupled to the leakage current detection module, where the leakage current detection module outputs the leakage current fault signal when the test switch is closed.

10 Claims, 5 Drawing Sheets

(56) References Cited

U.S. PATENT DOCUMENTS

| | | | |
|---|---|---|---|
| 6,697,238 B2* | 2/2004 | Bonilla | H02H 3/335 |
| | | | 361/104 |
| 8,605,402 B2 | 12/2013 | Ward et al. | |
| 9,312,680 B2* | 4/2016 | Li | H02H 5/047 |
| 9,331,582 B2 | 5/2016 | Goerke | |
| 9,356,402 B2 | 5/2016 | Sung et al. | |
| 9,535,106 B2 | 1/2017 | Li | |
| 9,547,047 B2 | 1/2017 | Li et al. | |
| 9,564,119 B2 | 2/2017 | Ryu et al. | |
| 9,697,926 B2 | 7/2017 | Huang et al. | |
| 10,840,698 B2* | 11/2020 | Li | H02H 7/228 |
| 10,886,724 B2* | 1/2021 | Li | H01B 7/0225 |
| 2006/0119997 A1 | 6/2006 | Lee | |
| 2007/0159740 A1 | 7/2007 | Williams et al. | |
| 2012/0119918 A1 | 5/2012 | Williams | |
| 2014/0117995 A1 | 5/2014 | Topucharla | |
| 2015/0349517 A1 | 12/2015 | Li et al. | |
| 2017/0222425 A1 | 8/2017 | Li et al. | |

* cited by examiner

LEAKAGE CURRENT DETECTION AND INTERRUPTION DEVICE FOR POWER CORD, AND POWER CONNECTOR AND APPLIANCE EMPLOYING THE SAME

BACKGROUND OF THE INVENTION

Field of the Invention

This invention relates to the electrical field, and in particular, it relates to a leakage current detection and interruption device for a power cord, as well as a power connector and an electrical appliance employing the same.

Description of Related Art

A leakage current detection and interruption (LCDI) device for a power cord is a safety device that can prevent fire danger caused by electrical appliances. It is implemented in a power cord that has a plug, and functions to detect leakage currents that may occur between the hot and neutral power lines and the leakage current detector line (the shield line), which extend between the plug and the load. The load may be electrical appliances such as air conditioner, dehumidifier, etc. Upon detecting a leakage current, the device cuts off power supply to the load, thereby preventing fire and ensuring safety. The device can prevent fire caused by arc fault which can result from damage of the insulation in the hot, neutral, and ground lines of the power cord due to aging, wear, pinch, animal chewing, etc.

Current standards for LCDI devices require that a reset switch RESET and a test switch TEST be provided on the device. The reset switch RESET is used to make or break power connection to the load, and the test switch TEST is used to test whether the device is functioning normally. The user needs to periodically operate the test switch TEST and the reset switch RESET to determine whether the device is functioning normally. In some conventional LCDI devices, when the test switch TEST is depressed to simulate a leakage current situation, it is not possible to determine whether the leakage current detection line is an open circuit.

SUMMARY

Accordingly, the present invention is directed to an LCDI device that substantially obviates one or more of the problems due to limitations and disadvantages of the related art.

To achieve the above objects, the present invention provides a leakage current detection and interruption device, which includes: a first and a second power supply line having an input end and an output end; a switch module, coupled on the first and second power supply lines between the input and output ends, configured to control an electrical connection between the input and output ends; a leakage current detection module, including a leakage current detection line configured to detect a leakage current on at least one of the first and second power supply lines, and to output a leakage current fault signal in response to detecting the leakage current; a drive module, configured to drive the switch module to disconnect the electrical connection between the input and output ends in response to either the leakage current fault signal or an open circuit fault signal, wherein the open circuit fault signal is correlated to an open circuit condition of the leakage current detection line, wherein the drive module includes: a solenoid; a rectifier bridge, coupled between the first and second power supply lines, configured to supply a working current to the solenoid; and a semiconductor switch element, coupled to the rectifier bridge, configured to change the working current in response to either the leakage current fault signal or the open circuit fault signal, to cause the solenoid to drive the switch module to disconnect the electrical connection between the input and output ends; and a test module, including a test switch coupled to the leakage current detection module, wherein the leakage current detection module is configured to, in response to the test switch being closed, output the leakage current fault signal to the drive module, causing the switch module to disconnect the power connection.

In some embodiments, the rectifier bridge includes: a first set of semiconductor devices, including a first semiconductor device and a second semiconductor device; a second set of semiconductor devices, including a third semiconductor device and a fourth semiconductor device; wherein when the test switch is closed, the leakage current fault signal causes changes in a current through the first set of semiconductor devices or a current through the second set of semiconductor devices, which causes the switch module to disconnect the electrical connection between the input and output ends.

In some embodiments, a first end of the leakage current detection line is coupled via a first resistor to a first end of the rectifier bridge, and a second end of the leakage current detection line is coupled via a conductor and a voltage divider circuit to a second end of the rectifier bridge, wherein the voltage divider circuit is further coupled to the semiconductor switch element, and wherein in response to the leakage current detection line being an open circuit, the voltage divider circuit outputs the open circuit fault signal to the semiconductor switch element.

In some embodiments, a third end of the rectifier bridge is coupled to one of the first and second power supply lines, and a fourth end of the rectifier bridge is coupled to another one of the first and second power supply lines.

In some embodiments, the voltage divider circuit includes: a second resistor coupled to the second end of the rectifier bridge; a third resistor coupled to the second resistor and to the leakage current detection line; and a fourth resistor coupled between the third resistor and the first end of the rectifier bridge, and coupled to a control electrode of the semiconductor switch element.

In some embodiments, the first end of the leakage current detection line is further coupled to the test switch, and wherein in response to the test switch being closed, the leakage current detection line outputs the leakage current fault signal to the drive module.

In some embodiments, the leakage current detection and interruption device further includes: an indicator circuit coupled to the rectifier bridge, configured to output an indicator signal in response to the electrical connection between the input and output ends being connected, wherein the indicator circuit includes a fifth resistor and a semiconductor light emitting element coupled in series.

In some embodiments, the leakage current detection line is configured to cover at least one of respective insulating layers of the first and second power supply lines.

In another aspect, the present invention provides a power connector, which includes: the leakage current detection and interruption device described above; a shell body; and a cord; wherein the switch module, the drive module, and the test module are disposed in the shell body, and the leakage current detection module is disposed in the cord.

In another aspect, the present invention provides an electrical appliance, which includes: the leakage current detection and interruption device described above; an electrical load; and a power connector; wherein the leakage current detection and interruption device is disposed in the power connector.

The leakage current detection and interruption device allows for detection of leakage currents in the power lines of a cord, and allows for detection of an open circuit fault condition of the leakage current detection line. When such open circuit fault condition is detected, the device can disconnect the power to the load.

BRIEF DESCRIPTION OF THE DRAWINGS

Preferred embodiments of the present invention are described with reference to the drawings. These drawings explain the embodiments and their operating principle, and only illustrate structures that are necessary to the understanding of the invention. These drawings are not to scale. In the drawings, like features are designated by like reference symbols. Further, the lines between components indicate electrical or magnetic coupling; but the lack of a line between components does not mean that there is no coupling between them.

FIG. 2b illustrates structural details of the cord of the power connector of FIG. 2a.

DETAILED DESCRIPTION OF PREFERRED EMBODIMENTS

Figure 1:
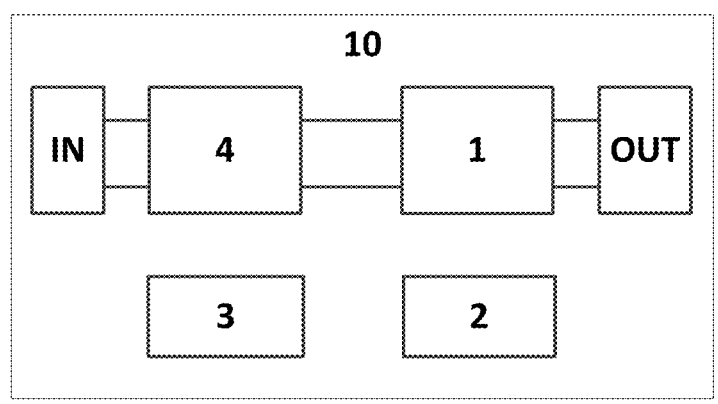
FIG. 1 is a block diagram of a leakage current detection and interruption device according to embodiments of the present invention.

Embodiments of the present invention are described below with reference to the drawings. These drawings and descriptions explain embodiments the invention but do not limit the invention. Other embodiments are possible without departing from the spirit and scope of the invention. Various modification and variations can be made in both the structure and the working principle of the device. Thus, it is intended that the scope of the invention is defined by the appended claims.

Some terms are defined here. A transistor may be of any type and structure, such as field-effect transistor (FET) including metal-oxide-semiconductor field-effect transistor (MOSFET), bipolar junction transistor (BJT), silicon controlled rectifier (SCR), etc. When the transistor is a FET, the control electrode refers to the gate of the FET, the first electrode may be the drain or source of the FET, and the corresponding second electrode may be the source or drain of the FET. When the transistor is a BJT, the control electrode refers to the base of the BJT, the first electrode may be the collector or emitter of the BJT, and the corresponding second electrode may be the emitter or collector of the BJT. When the transistor is an SCR, the control electrode refers to the control electrode G of the SCR, the first electrode may be the anode, and the corresponding second electrode may be the cathode. A leakage current fault signal is a signal generated when the leakage current detection line detects a leakage current on the power supply lines. The leakage current may be a simulated leakage current generated by closing the test switch. An open circuit fault signal is a signal provided to the drive module when the leakage current detection circuit is open circuit. The drive module is operable to disconnect the power supply in response to either the leakage current fault signal or the open circuit fault signal.

The inventors discovered, through experimentation, that the test switch TEST of some conventional LCDI devices can only detect whether the internal circuit and the trip mechanism of the LCDI device is functioning normally, but cannot detect whether the leakage current detection function of the leakage current detection line (the shield line) of the external cord between the plug an the appliance is normal. If the leakage current detection line (the shield line) of the external cord is an open circuit, even when the user operations of the test switch TEST and the reset switch RESET indicate normal function, the device may have already lost its leakage current protection function. This is a serious safety threat. Further, conventional LCDI devices typically use woven copper sheet and aluminum foil to cover and wrap the current carrying wires and to act as the leakage current detection line (the shield line) for detecting leakage current in the power supply lines. The cord is prone to the problem that the leakage current detection line (the shield line) becoming an open circuit due to movement, bending, pinch, aging, animal chewing, etc. during long term use, which causes the LCDI product to lose its leakage current detection and protection function.

Embodiments of the present invention provide an LCDI device that can automatically monitor whether the leakage current detection line (the shield line) is an open circuit. When such an open circuit is detected, the device open the reset switch RESET to cut off the electrical connection between its power input and power output ends.

FIG. 1 is a block diagram of a leakage current detection and interruption device according to embodiments of the present invention.

As shown in FIG. 1, the leakage current detection and interruption (LCDI) device 10 includes a leakage current detection module 1, a test module 2, a drive module 3 and a switch module 4. The switch module 4 is electrically coupled between the input end IN and the output end OUT of the device, and operates to control the electrical connection between the input end and the output end. The leakage current detection module 1 includes leakage current detection lines, for at least detecting whether a leakage current is present on a first and/or a second power supply line of the cord. When a leakage current is detected, the leakage current detection module 1 provides a leakage current fault signal to the drive module 3. The test module 2 includes a test switch (a mechanical switch) and is coupled to the leakage current detection module 1. When the test switch is closed, the leakage current detection module 1 provides a leakage current fault signal to the drive module 3. In response to the leakage current fault signal and/or open circuit fault signal, the drive module 3 drives the switch module to disconnect the power supply. Here, the open circuit fault signal is correlated to the open circuit condition of the leakage current detection line.

Figure 2A:
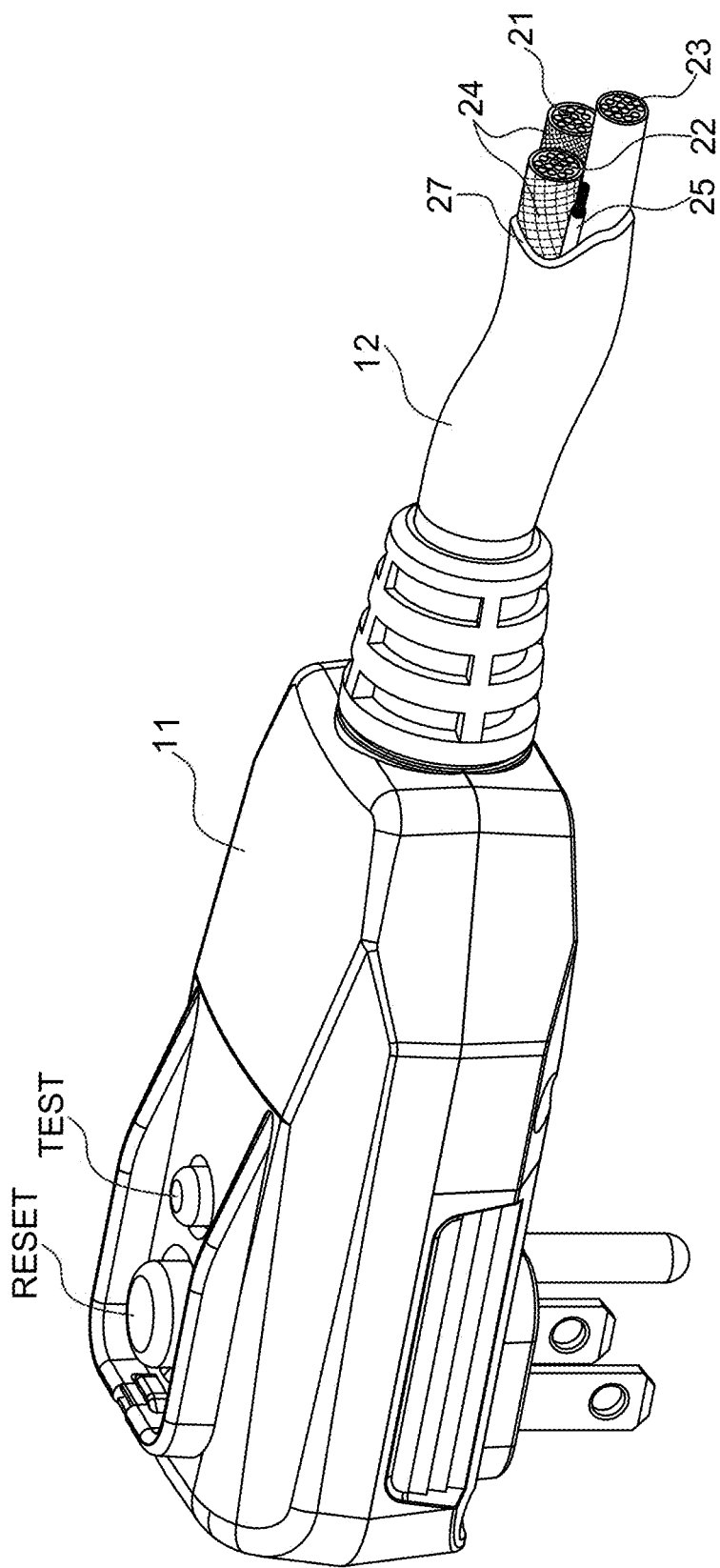
FIG. 2a illustrates a power connector according to an embodiment of the present invention.
Figure 2B:
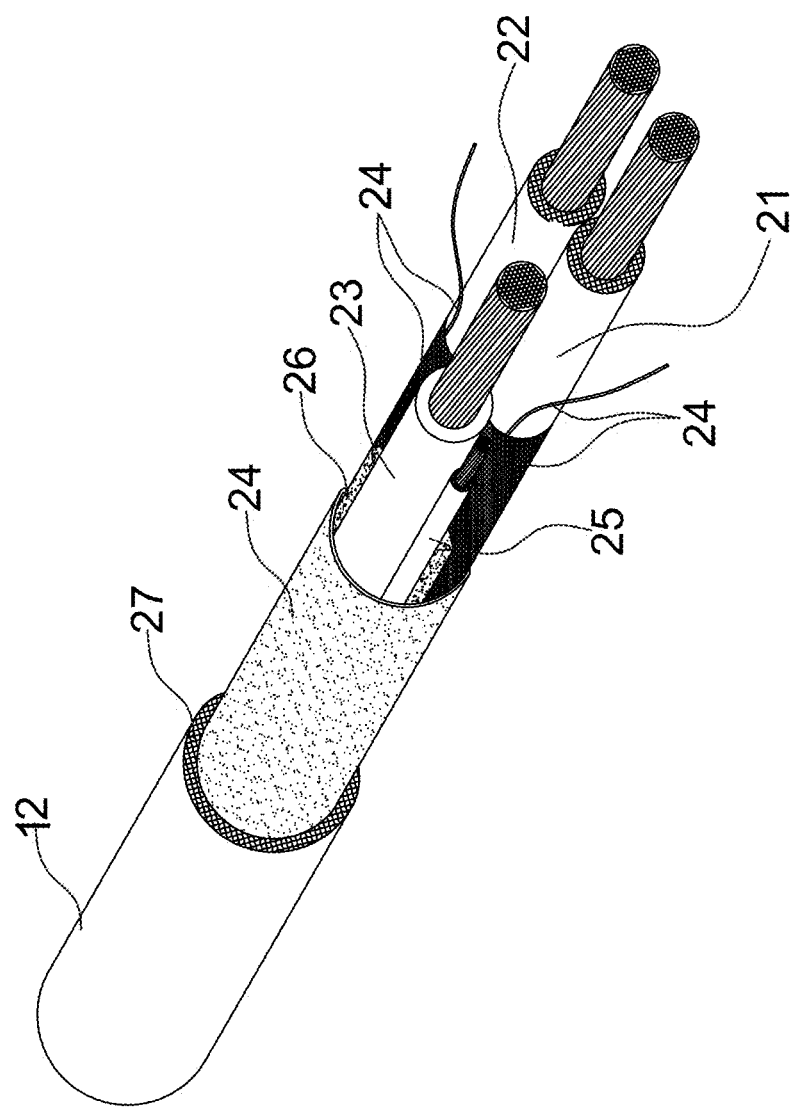

FIG. 2a illustrates a power connector according to an embodiment of the present invention. FIG. 2b illustrates structural details of the cord of the power connector of FIG. 2a. The power connector includes a power cord and the leakage current interruption device.

As shown in the figures, the power connector includes a shell body 11 and a power cord 12. The body 11 accommodates the leakage current detection and interruption device, and has through holes for accommodating the reset switch RESET and the test switch TEST. The cord 12 includes first power supply line (L) 21, second power supply line (N) 22, ground line 23, leakage current detection line (shield line) 24, conductor line 25, filler material 26 and insulating outer cover 27. As seen in FIG. 2b, the leakage current detection line 24 covers the insulating layers of the first power supply line 21 and the second power supply line 22. In other embodiment, the leakage current detection line 24 may cover one of the two power supply lines. The leakage current detection line 24 can also cover the ground line.

Figure 3:
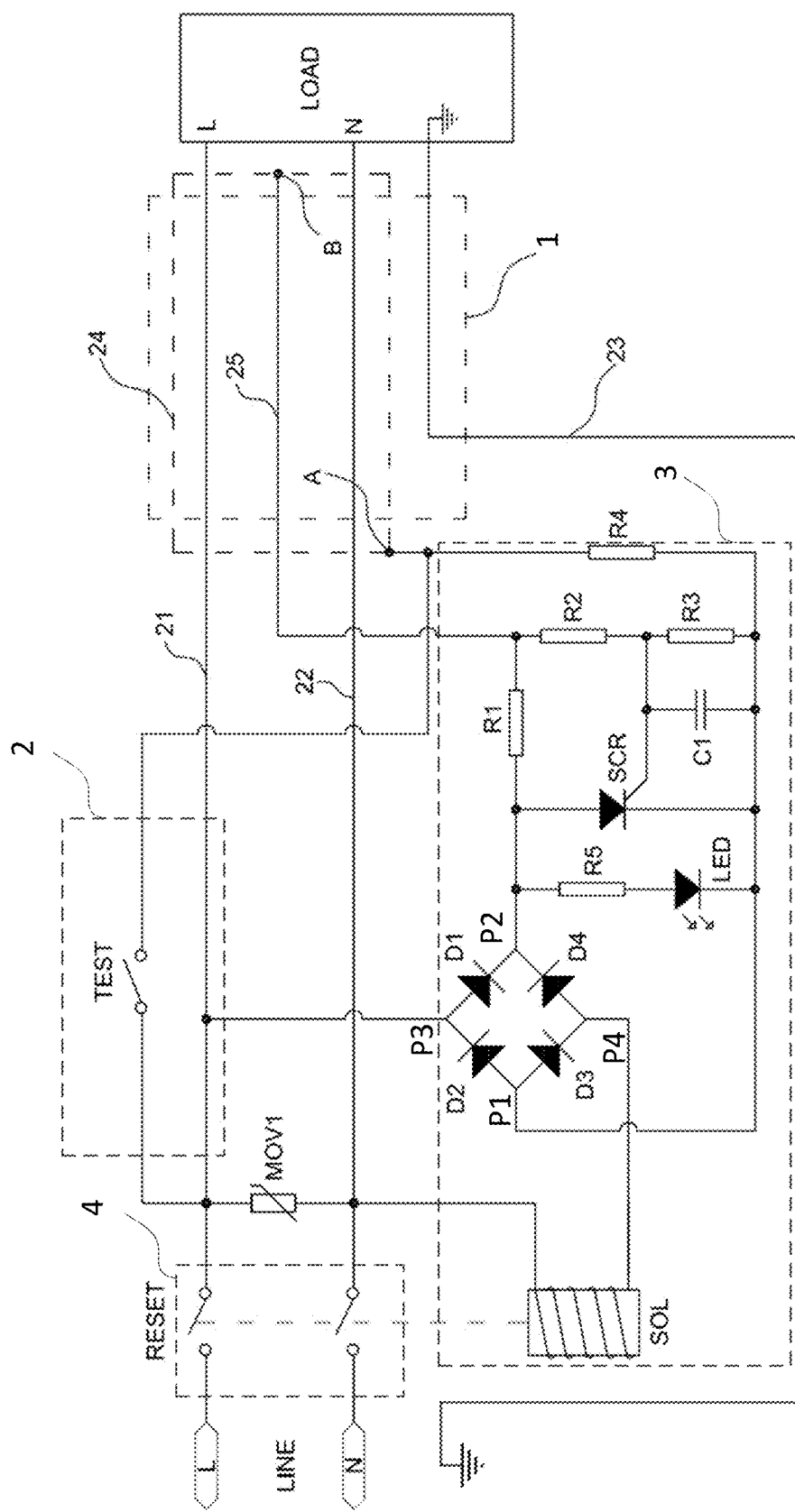
FIG. 3 is a circuit diagram of a leakage current detection and interruption device according to an embodiment of the present invention.

FIG. 3 is a circuit diagram of a leakage current detection and interruption device according to an embodiment of the present invention.

As shown in the figures, the reset switch RESET (a mechanical switch) is coupled between the input end and the output end of the device. One end of the leakage current detection line 24 is coupled to the test switch TEST and the drive module 3 at point A, and another end of the leakage current detection line 24 is coupled to the drive module at point B. The drive module 3 includes a solenoid SOL, a rectifier bridge (D1-D4) and a semiconductor switch element (e.g. silicon-controlled rectifier) SCR. The rectifier bridge is coupled via the solenoid SOL between the first power supply line and the second power supply line, to supply a working current to the solenoid SOL. The switch element SCR is coupled to the rectifier bridge. The rectifier bridge includes two sets of semiconductor devices, the first set including semiconductor devices (e.g. diodes) D1 and D3, the second set including semiconductor devices D2 and D4. When the test switch TEST is closed, the leakage current changes the current through the first set of semiconductor devices or the second set of semiconductor devices, causing the switch module 4 to disconnect the electrical connection between the input and output ends.

More specifically, the leakage current detection line 24 is coupled at one end via resistor R4 to the first end P1 of the rectifier bridge, and at the other end via conductor 25 and a voltage divider circuit to the second end P2 of the rectifier bridge. The third end P3 of the rectifier bridge is coupled to the first power supply line, and the fourth end P4 of the rectifier bridge is coupled via the solenoid SOL to the second power supply line. When a leakage current is present on the power supply lines 21 and/or 22, the leakage current detection line 24 supply a leakage current fault signal to the drive module 3. It should be understood that the solenoid SOL, which forms a current path with the switch device SCR, may alternatively be coupled to any end of the rectifier bridge.

The voltage divider circuit includes resistors R1-R3, where resistor R1 is coupled to the second end P2 of the rectifier bridge, resistor R2 is coupled to resistor R1 and the leakage current detection line 24, and resistor R3 is coupled between resistor R2 and the first end P1 of the rectifier bridge and also coupled to the control electrode of the switch element SCR. Therefore, the leakage current fault signal and/or the open circuit fault signal changes the voltage across resistor R3, which in turn changes the working current through solenoid SOL.

Under control of the leakage current fault signal and/or the open circuit fault signal, the switch element SCR changes (e.g., increases) the working current through the solenoid SOL, so that solenoid SOL drives the switch module to disconnect the electrical connection. It should be understood that by adjusting the type of the reset switch RESET and related circuit elements, the switch element SCR may alternatively decrease the working current of solenoid SOL to accomplish the disconnection of the electrical connection by the switch module 4.

The test operation works as follows.

When the reset switch RESET is closed, and the user depresses (closes) the test switch TEST, the leakage current detection line 24 is coupled into the circuit, to form a test current loop from point A, the leakage current detection line 24, point B, conductor 25, to resistor R2. In other words, by closing the test switch TEST, the drive module 3 obtains a simulated leakage current fault signal. At this time, the voltage across resistor R3 increases, which triggers the semiconductor switch element SCR to become conductive; thus, the two power supply lines are coupled to each other via the rectifier bridge, the semiconductor switch element SCR and the solenoid SOL. This generates a magnetic field in solenoid SOL to open the reset switch RESET, cutting off the electrical connection between the power input end and the power output end. If the leakage current detection line 24 is an open circuit, the above actions will not occur and the leakage current detection and interruption device will not trip in response to closing the test switch TEST, so the test will fail. This will alert the user that the leakage current detection and interruption device is faulty and should not be used.

The leakage current detection and interruption device may further include an indicator circuit (R5, LED) which includes a resistor R5 and a semiconductor light emitting element (such as light emitting diode) LED coupled in series. When the first and second power supply lines are energized, the light emitting diode LED generates an indicator signal to indicate that power is connected. Those skilled in the art will appreciate that the indicator circuit may alternatively be coupled at other locations of the circuit, and is not limited to the position shown in FIG. 3.

The open circuit self-test operation works as follows.

When the reset switch RESET is closed, because point A is coupled to the rectifier bridge (D1-D4) via resistor R4, and point B is coupled to the rectifier bridge (D1-D4) via resistor R1, a current path is formed from power supply line 21 to power supply line 22 via the rectifier bridge, resistor R1, conductor 25, leakage current detection line 24, resistor R4, and solenoid SOL (or, a current path is formed from power supply line 22 to power supply line 21 via solenoid SOL, the rectifier bridge, resistor R1, conductor 25, leakage current detection line 24, and resistor R4). In this embodiment, when the leakage current detection and interruption device is not faulty, the voltage across resistor R3 is not sufficient to trigger the switch element SCR to become conductive, so the device works normally. When the leakage current detection line 24 is an open circuit, the voltage between resistor R1 and resistor R2 rises, so that the voltage across resistor R3 rises (this constitutes the open circuit fault signal), which triggers switch element SCR to become conductive. As a result, solenoid SOL generates a magnetic field, which opens the reset switch RESET to disconnect the power supply.

The leakage current detection operation works as follows.

When the reset switch RESET is closed, if the leakage current detection line 24 detects a leakage current on power supply line 21, then the voltage across resistor R3 rises (this constitutes the leakage current fault signal), which triggers switch element SCR to become conductive. As a result, solenoid SOL generates a magnetic field, which opens the reset switch RESET to disconnect the power supply.

Similarly, if the leakage current detection line 24 detects a leakage current on power supply line 22, then the voltage across resistor R3 rises, which triggers switch element SCR to become conductive. As a result, solenoid SOL generates a magnetic field, which opens the reset switch RESET to disconnect the power supply.

Figure 4:
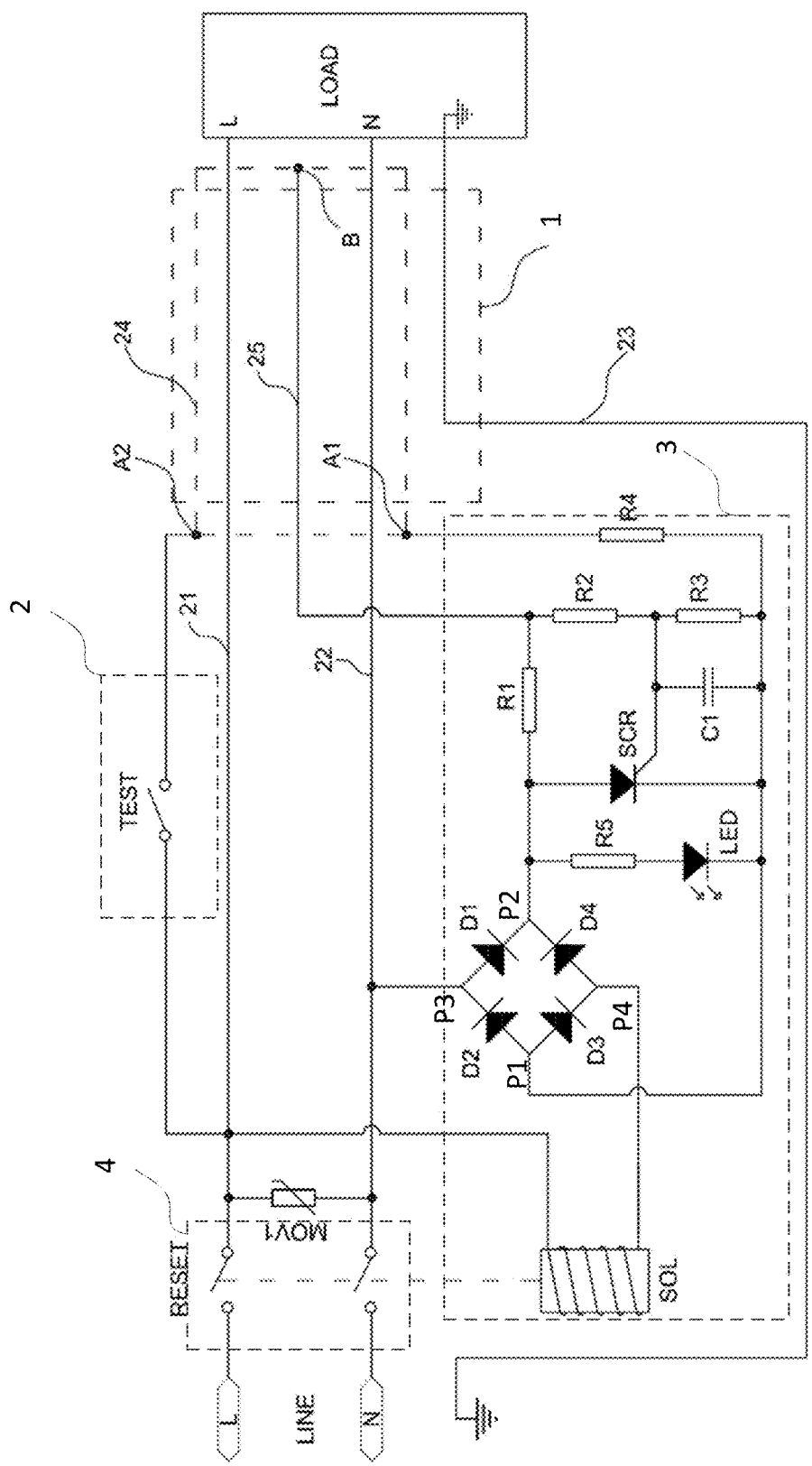
FIG. 4 is a circuit diagram of another leakage current detection and interruption device according to another embodiment of the present invention.

FIG. 4 is a circuit diagram of another leakage current detection and interruption device according to another embodiment of the present invention.

Compared to the embodiment of FIG. 3, in the embodiment of FIG. 4, the coupling positions of rectifier bridge (D1-D4) to power supply lines 21, 22 are the opposite. Here, one end of the leakage current detection line 24 is coupled to the test module 2 at point A2 and also to the drive module 3 at point A1, and the other end of the leakage current detection line 24 is coupled to the drive module 3 at point B.

The test operation works as follows.

When the reset switch RESET is closed, and the user depresses (closes) the test switch TEST, the voltage between resistors R2 and R3 rises, which triggers switch element SCR to become conductive. As a result, solenoid SOL generates a magnetic field, which opens the reset switch RESET to disconnect the power supply. On the other hand, if the leakage current detection line 24 is an open circuit, the above actions will not occur and the leakage current detection and interruption device will not trip in response to the test switch TEST being closed, so the test will fail. This will alert the user that the leakage current detection and interruption device is faulty and should not be used.

The open circuit self-test operation works as follows.

When the reset switch RESET is closed, because point A1 is coupled to the rectifier bridge (D1-D4) via resistor R4 and point B is coupled to the rectifier bridge (D1-D4) via resistor R1, a current path is formed between power supply line 21 and power supply line 22. In this embodiment, when the leakage current detection and interruption device is not faulty, the voltage across resistor R3 is not sufficient to trigger switch element SCR to become conductive, so the device works normally. When the leakage current detection line 24 is an open circuit, the voltage between resistor R1 and resistor R2 rises, so that the voltage across resistor R3 rises (this constitutes the open circuit fault signal), which triggers switch element SCR to become conductive. As a result, solenoid SOL generates a magnetic field, which opens the reset switch RESET to disconnect the power supply.

The leakage current detection operation works as follows.

When the reset switch RESET is closed, if the leakage current detection line 24 detects a leakage current on power supply line 21, then the voltage between resistors R1 and R2 rises, and accordingly the voltage across resistor R3 rises (this constitutes the leakage current fault signal), which triggers switch element SCR to become conductive. As a result, solenoid SOL generates a magnetic field, which opens the reset switch RESET to disconnect the power supply.

Similarly, if the leakage current detection line 24 detects a leakage current on power supply line 22, then the voltage across resistor R3 rises, which triggers switch element SCR to become conductive. As a result, solenoid SOL generates a magnetic field, which opens the reset switch RESET to disconnect the power supply.

Figure 5:
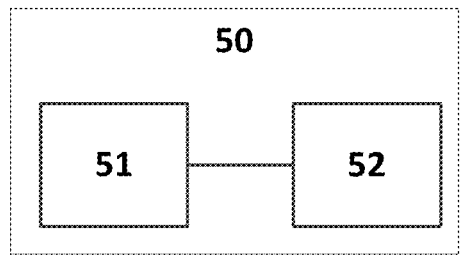
FIG. 5 is a block diagram of an electrical appliance according to an embodiment of the present invention.

Another embodiment of the present invention provides an electrical appliance, as shown in FIG. 5. The electrical appliance 50 includes a electrical load 51 and the power connector 52. The power connector 52 is coupled between a power source and the load 51 to supply power to the load 51. The power connector 52 includes the leakage current detection and interruption device described above.

It will be apparent to those skilled in the art that various modification and variations can be made in the leakage current detection and interruption device and related power connector and electrical appliance of the present invention without departing from the spirit or scope of the invention. Thus, it is intended that the present invention cover modifications and variations that come within the scope of the appended claims and their equivalents.

What is claimed is:

1. A leakage current detection and interruption device, comprising:
  a first and a second power supply line having an input end and an output end;
  a switch module, coupled on the first and second power supply lines between the input and output ends, configured to control an electrical connection between the input and output ends;
  a leakage current detection module, including a leakage current detection line configured to detect a leakage current on at least one of the first and second power supply lines, and to output a leakage current fault signal in response to detecting the leakage current;
  a drive module, configured to drive the switch module to disconnect the electrical connection between the input and output ends in response to either the leakage current fault signal or an open circuit fault signal, wherein the open circuit fault signal is correlated to an open circuit condition of the leakage current detection line, wherein the drive module includes:
    a solenoid;
    a rectifier bridge, coupled between the first and second power supply lines, configured to supply a working current to the solenoid; and
    a semiconductor switch element, coupled to the rectifier bridge, configured to change the working current in response to either the leakage current fault signal or the open circuit fault signal, to cause the solenoid to drive the switch module to disconnect the electrical connection between the input and output ends; and
  a test module, including a test switch coupled to the leakage current detection module, wherein the leakage current detection module is configured to, in response to the test switch being closed, output the leakage current fault signal to the drive module.

2. The leakage current detection and interruption device of claim 1, wherein the rectifier bridge includes:
  a first set of semiconductor devices, including a first semiconductor device and a second semiconductor device;
  a second set of semiconductor devices, including a third semiconductor device and a fourth semiconductor device;
  wherein when the test switch is closed, the leakage current fault signal causes changes in a current through the first set of semiconductor devices or a current through the second set of semiconductor devices, which causes the switch module to disconnect the electrical connection between the input and output ends.

3. The leakage current detection and interruption device of claim 2, wherein a first end of the leakage current detection line is coupled via a first resistor to a first end of the rectifier bridge, and a second end of the leakage current detection line is coupled via a conductor and a voltage divider circuit to a second end of the rectifier bridge,
  wherein the voltage divider circuit is further coupled to the semiconductor switch element, and wherein in response to the leakage current detection line being an open circuit, the voltage divider circuit outputs the open circuit fault signal to the semiconductor switch element.

4. The leakage current detection and interruption device of claim 3, wherein a third end of the rectifier bridge is coupled to one of the first and second power supply lines, and a fourth end of the rectifier bridge is coupled to another one of the first and second power supply lines.

5. The leakage current detection and interruption device of claim 4, wherein the voltage divider circuit includes:
- a second resistor coupled to the second end of the rectifier bridge;
- a third resistor coupled to the second resistor and to the leakage current detection line; and
- a fourth resistor coupled between the third resistor and the first end of the rectifier bridge, and coupled to a control electrode of the semiconductor switch element.

6. The leakage current detection and interruption device of claim 3, wherein the first end of the leakage current detection line is further coupled to the test switch, and wherein in response to the test switch being closed, the leakage current detection line outputs the leakage current fault signal to the drive module.

7. The leakage current detection and interruption device of claim 1, further comprising:
an indicator circuit coupled to the rectifier bridge, configured to output an indicator signal in response to the electrical connection between the input and output ends being connected, wherein the indicator circuit includes a fifth resistor and a semiconductor light emitting element coupled in series.

8. The leakage current detection and interruption device of claim 1, wherein the leakage current detection line is configured to cover at least one of respective insulating layers of the first and second power supply lines.

9. A power connector, comprising:
the leakage current detection and interruption device of claim 1;
a shell body; and
a cord;
wherein the switch module, the drive module, and the test module are disposed in the shell body, and the leakage current detection module is disposed in the cord.

10. An electrical appliance, comprising:
the leakage current detection and interruption device of claim 1;
an electrical load; and
a power connector;
wherein the leakage current detection and interruption device is disposed in the power connector.

* * * * *